US011953586B2

(12) United States Patent
Salter et al.

(10) Patent No.: US 11,953,586 B2
(45) Date of Patent: Apr. 9, 2024

(54) BATTERY-POWERED VEHICLE SENSORS

(71) Applicant: Ford Global Technologies, LLC, Dearborn, MI (US)

(72) Inventors: Stuart C. Salter, White Lake, MI (US); John Robert Van Wiemeersch, Novi, MI (US); Donald Paul Bilger, Livonia, MI (US); Tarik Safir, Chesterfield (GB); Sam Harris, Billericay (GB)

(73) Assignee: Ford Global Technologies, LLC, Dearborn, MI (US)

( * ) Notice: Subject to any disclaimer, the term of this patent is extended or adjusted under 35 U.S.C. 154(b) by 455 days.

(21) Appl. No.: 17/199,688

(22) Filed: Mar. 12, 2021

(65) Prior Publication Data
US 2022/0155436 A1    May 19, 2022

Related U.S. Application Data

(63) Continuation-in-part of application No. 17/099,869, filed on Nov. 17, 2020.

(51) Int. Cl.
*G01S 13/88* (2006.01)
*B60Q 1/00* (2006.01)
(Continued)

(52) U.S. Cl.
CPC ............ *G01S 13/88* (2013.01); *B60Q 1/0023* (2013.01); *B60R 11/04* (2013.01); *G01S 13/867* (2013.01);
(Continued)

(58) Field of Classification Search
CPC ........ G01S 13/88; G01S 13/867; G01S 13/86; G01S 2013/932; G01S 2013/9322;
(Continued)

(56) References Cited

U.S. PATENT DOCUMENTS 5,563,576 A    10/1996  Drori et al.
5,581,464 A *  12/1996  Woll .................... G07C 5/0858
                                                    340/459
(Continued)

FOREIGN PATENT DOCUMENTS

DE    102015118874 A1    5/2017
WO       2009094367 A1    7/2009
(Continued)

OTHER PUBLICATIONS

Non-Final Office Action for U.S. Appl. No. 17/199,805 as issued by the USPTO dated Aug. 23, 2022.
(Continued)

*Primary Examiner* — Vivek D Koppikar
*Assistant Examiner* — Dominick Mulder
(74) *Attorney, Agent, or Firm* — Frank Lollo; Bejin Bieneman PLC

(57) ABSTRACT

A computer includes a processor and a memory storing instructions executable by the processor to select a scanning rate for a first sensor of a vehicle based on at least one of data related to a current time or data related to a location of the vehicle; instruct the first sensor to run at the selected scanning rate; in response to receiving data from the first sensor indicating a newly present object, turn on a second sensor; and then record data from the second sensor. The second sensor has a higher power draw than the first sensor.

20 Claims, 7 Drawing Sheets

(51) Int. Cl.
| | |
|---|---|
| *B60R 11/04* | (2006.01) |
| *G01S 13/86* | (2006.01) |
| *G01V 3/00* | (2006.01) |
| *B60Q 1/44* | (2006.01) |
| *B60R 11/00* | (2006.01) |
| *H04L 67/12* | (2022.01) |

(52) U.S. Cl.
CPC .................. *G01V 3/00* (2013.01); *B60Q 1/44* (2013.01); *B60R 2011/0043* (2013.01); *H04L 67/12* (2013.01)

(58) Field of Classification Search
CPC ....... G01S 13/931; B60Q 1/0023; B60Q 1/44; B60Q 1/302; B60R 11/04; B60R 2011/0043; G01V 3/00; H04L 67/12
USPC ......................................................... 342/61
See application file for complete search history.

(56) References Cited

U.S. PATENT DOCUMENTS

| | | | |
|---|---|---|---|
| 7,417,585 B2 | 8/2008 | Yamagami et al. | |
| 8,768,549 B2 | 7/2014 | Erko et al. | |
| 9,266,443 B2 | 2/2016 | Payne et al. | |
| 9,344,683 B1* | 5/2016 | Nemat-Nasser | ........ B60R 11/04 |
| 9,394,059 B2 | 7/2016 | Cox et al. | |
| 9,412,268 B2 | 8/2016 | Saptharishi et al. | |
| 9,438,868 B2* | 9/2016 | Boettiger | ............... H04N 23/61 |
| 9,784,229 B2 | 10/2017 | Holub et al. | |
| 9,880,278 B2 | 1/2018 | van Uifelen et al. | |
| 10,600,257 B2 | 3/2020 | Jiang et al. | |
| 10,607,458 B1 | 3/2020 | Sampson et al. | |
| 10,712,742 B2* | 7/2020 | Valois | ................... G01S 13/931 |
| 10,850,709 B1 | 12/2020 | Nagata et al. | |
| 10,899,317 B1 | 1/2021 | Moeller et al. | |
| 11,099,264 B2* | 8/2021 | Bhatia | ..................... G01S 13/06 |
| 11,104,270 B1 | 8/2021 | Timms | |
| 11,206,465 B1* | 12/2021 | Krotosky | .................. H04Q 9/02 |
| 11,427,143 B1 | 8/2022 | Linsmeier et al. | |
| 11,823,564 B1* | 11/2023 | Wittevrongel | ......... G06V 10/22 |
| 2003/0030548 A1 | 2/2003 | Kovacs et al. | |
| 2004/0257045 A1 | 12/2004 | Sada et al. | |
| 2005/0073433 A1 | 4/2005 | Gunderson et al. | |
| 2005/0193212 A1 | 9/2005 | Yuhara | |
| 2005/0200606 A1 | 9/2005 | Willemin et al. | |
| 2007/0067079 A1 | 3/2007 | Kosugi | |
| 2008/0097664 A1 | 4/2008 | Aoyama et al. | |
| 2009/0064696 A1 | 3/2009 | Perkins | |
| 2010/0265344 A1 | 10/2010 | Velarde et al. | |
| 2011/0216200 A1* | 9/2011 | Chung | ................... H04N 7/183 348/148 |
| 2012/0044046 A1 | 2/2012 | Al-Jafar | |
| 2012/0044327 A1 | 2/2012 | Horita et al. | |
| 2012/0188054 A1 | 7/2012 | Bongard | |
| 2013/0117078 A1 | 5/2013 | Weik, III et al. | |
| 2014/0067152 A1* | 3/2014 | Swanson | ................. H04W 4/46 701/1 |
| 2015/0042815 A1 | 2/2015 | Park et al. | |
| 2016/0104325 A1 | 4/2016 | Lu | |
| 2016/0323508 A1* | 11/2016 | Ayalasomayajula | ......................... H04N 23/6812 |
| 2016/0331192 A1 | 11/2016 | Rubenson et al. | |
| 2016/0332535 A1 | 11/2016 | Bradley et al. | |
| 2016/0356594 A1 | 12/2016 | Sorenson | |
| 2017/0075888 A1* | 3/2017 | Ekin | ...................... G06V 20/56 |
| 2017/0160392 A1 | 6/2017 | Brisimitzakis et al. | |
| 2017/0337435 A1* | 11/2017 | Uliyar | ............. G06V 30/19173 |
| 2018/0053313 A1* | 2/2018 | Smith | ...................... G06F 18/22 |
| 2018/0147986 A1* | 5/2018 | Chi | ...................... H04N 23/671 |
| 2018/0324393 A1 | 11/2018 | Ryan et al. | |
| 2018/0332218 A1 | 11/2018 | Yoshimura | |
| 2019/0102963 A1 | 4/2019 | Owens et al. | |
| 2019/0108010 A1 | 4/2019 | Tillman et al. | |
| 2019/0122460 A1* | 4/2019 | Reyes | .................... G08G 1/162 |
| 2019/0141419 A1 | 5/2019 | Xu et al. | |
| 2019/0225150 A1 | 7/2019 | Nohl et al. | |
| 2019/0228647 A1 | 7/2019 | Conde et al. | |
| 2019/0249635 A1 | 8/2019 | Khafagy et al. | |
| 2019/0391250 A1 | 12/2019 | Cohen et al. | |
| 2020/0025964 A1* | 1/2020 | Kubo | ........................ G01D 5/24 |
| 2020/0031312 A1 | 1/2020 | Schat et al. | |
| 2020/0033849 A1 | 1/2020 | Yiu et al. | |
| 2020/0114886 A1* | 4/2020 | Kim | ........................ G08G 1/163 |
| 2020/0209377 A1 | 7/2020 | Ogura et al. | |
| 2020/0209869 A1* | 7/2020 | Toyoura | ................ G01S 17/931 |
| 2020/0247423 A1 | 8/2020 | Almahmoud et al. | |
| 2020/0282921 A1* | 9/2020 | Herman | .................. H04N 23/60 |
| 2020/0327757 A1 | 10/2020 | Kelley et al. | |
| 2020/0339101 A1 | 10/2020 | Gantt, Jr. et al. | |
| 2020/0408876 A1 | 12/2020 | Weber et al. | |
| 2021/0001810 A1 | 1/2021 | Rivard et al. | |
| 2021/0026019 A1 | 1/2021 | Gahagan et al. | |
| 2021/0086761 A1 | 3/2021 | El Assaad | |
| 2021/0092321 A1 | 3/2021 | Li et al. | |
| 2021/0178936 A1 | 6/2021 | Yetukuri et al. | |
| 2021/0223359 A1* | 7/2021 | Harrison | .................. G01S 13/42 |
| 2021/0245662 A1 | 8/2021 | Blank et al. | |
| 2021/0309183 A1* | 10/2021 | Bielby | .................... G06V 20/52 |
| 2021/0309257 A1 | 10/2021 | Roberts et al. | |
| 2021/0349204 A1 | 11/2021 | Brodsky et al. | |
| 2022/0123570 A1 | 4/2022 | Fuchs et al. | |
| 2022/0126832 A1* | 4/2022 | Ewert | ................... B60W 40/04 |
| 2022/0250583 A1 | 8/2022 | Garg et al. | |
| 2023/0056115 A1* | 2/2023 | Arnold | ................... H04L 67/62 |

FOREIGN PATENT DOCUMENTS

| | | |
|---|---|---|
| WO | 2019013948 A1 | 1/2019 |
| WO | 2021003440 A1 | 1/2021 |

OTHER PUBLICATIONS

Final Office Action for U.S. Appl. No. 17/199,805 as issued by the USPTO dated Dec. 6, 2022.
Non-Final Office Action for U.S. Appl. No. 17/099,869, filed Nov. 17, 2020, as issued by the USPTO dated Mar. 28, 2023.
Non-Final Office Action for U.S. Appl. No. 17/199,954, filed Mar. 12, 2023, as issued by the USPTO dated Jun. 22, 2023.
Ex-Parte Quayle Office Action for U.S. Appl. No. 17/199,768, filed Mar. 12, 2023, as issued by the PTO dated Jun. 23, 2023.
Non-Final Office Action for U.S. Appl. No. 17/199,887, filed Mar. 12, 2021, as issued by the USPTO dated Sep. 13, 2023.
Notice of Allowance for U.S. Appl. No. 17/199,954, filed Mar. 12, 2021, as issued by the USPTO dated Sep. 28, 2023.
Notice of Allowance for U.S. Appl. No. 17/099,869, filed Nov. 17, 2020, as issued by the USPTO dated Jul. 13, 2023.
Notice of Allowance for U.S. Appl. No. 17/199,887, filed Mar. 12, 2021, as issued by the USPTO Dec. 29, 2023.

* cited by examiner

BATTERY-POWERED VEHICLE SENSORS

CROSS-REFERENCE TO RELATED APPLICATION

This application is a continuation-in-part of, and as such claims priority to, U.S. patent application Ser. No. 17/099,869, filed on Nov. 17, 2020, which is hereby incorporated by reference in its entirety.

BACKGROUND

Center high-mounted stop lamps (CHMSL) are brake lamps positioned above a rear window of a vehicle and centered laterally on the vehicle. CHMSLs have been required by United States regulations for new cars and light trucks since the 1990s. The purpose of the CHMSL is to provide better visibility to other vehicles, which may not have a good view of the left and right brake lamps of the vehicle.

DETAILED DESCRIPTION

Figure 1:
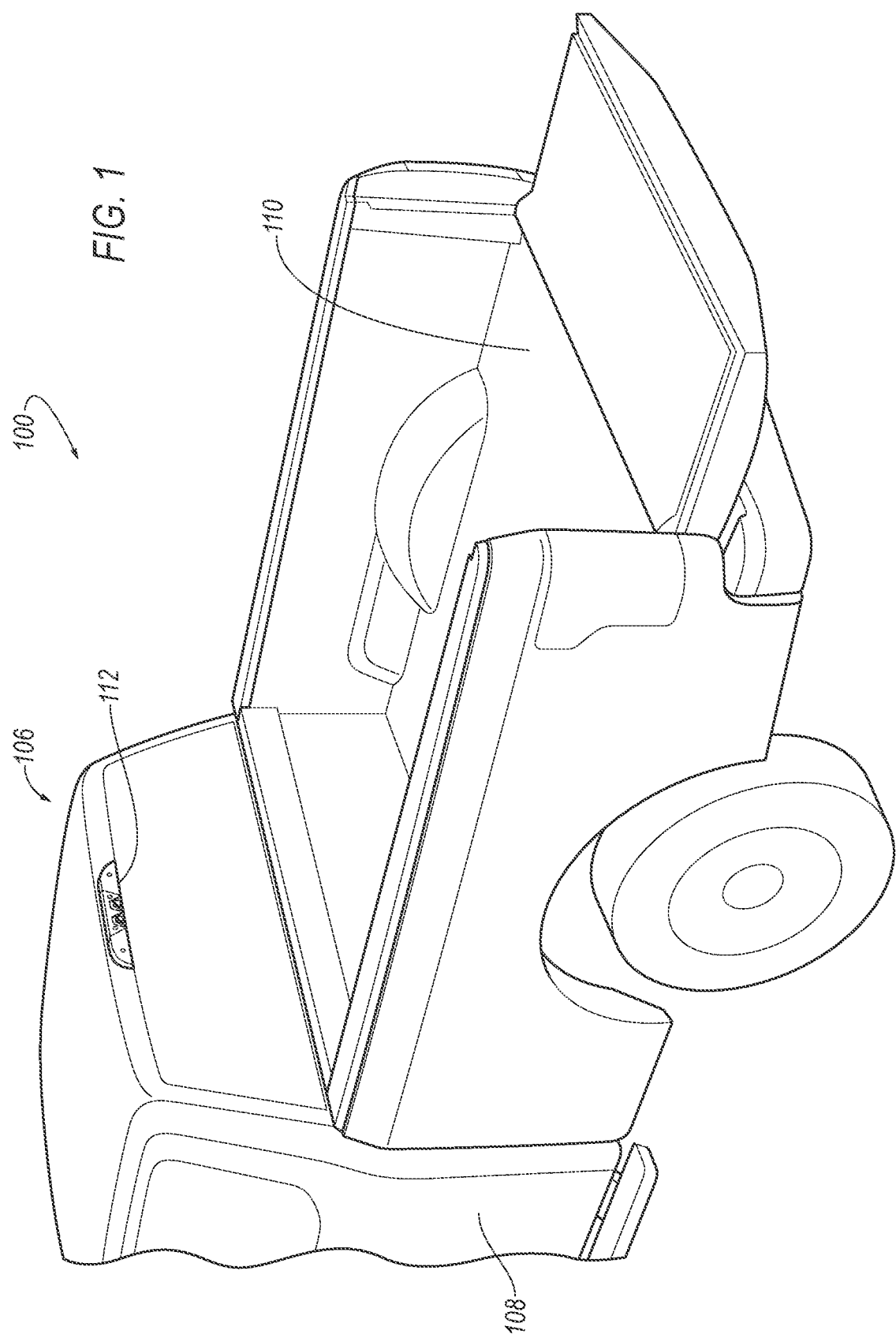
FIG. 1 is a rear perspective view of an example vehicle.

A computer including a processor and a memory storing instructions executable by the processor to select a scanning rate for a first sensor of a vehicle based on at least one of data related to a current time or data related to a location of the vehicle; instruct the first sensor to run at the selected scanning rate; in response to receiving data from the first sensor indicating a newly present object, turn on a second sensor; and then record data from the second sensor. The second sensor has a higher power draw than the first sensor.

Selecting the scanning rate for the first sensor may include selecting the scanning rate based on the current time. Selecting the scanning rate for the first sensor may include selecting the scanning rate based on a duration without the first sensor receiving data indicating a newly present object.

Selecting the scanning rate for the first sensor may include selecting the scanning rate based on a duration since the vehicle turned off.

Selecting the scanning rate for the first sensor may include selecting the scanning rate based on a current time of day.

Selecting the scanning rate for the first sensor may include selecting the scanning rate based on a current day of the week.

The instructions further may include instructions to adjust the selected scanning rate based on a change of the current time.

Selecting the scanning rate for the first sensor may include selecting the scanning rate based on the data related to the location of the vehicle. Selecting the scanning rate for the first sensor may include selecting the scanning rate based on statistical data about the location of the vehicle. The statistical data may be population data.

Selecting the scanning rate for the first sensor may include selecting the scanning rate based on data indicating a public event within a distance threshold of the location of the vehicle. Selecting the scanning rate for the first sensor may include selecting the scanning rate based on data indicating a type of the public event.

Selecting the scanning rate for the first sensor may include selecting the scanning rate based on a risk score calculated using the at least one of the data related to the current time or the data related to the location of the vehicle.

A system for a vehicle includes a first sensor, a second sensor having a higher power draw than the first sensor, and a computer communicatively coupled to the first sensor and the second sensor. The computer is programmed to select a scanning rate for the first sensor based on at least one of data related to a current time or data related to a location of the vehicle; instruct the first sensor to run at the selected scanning rate; in response to receiving data from the first sensor indicating a newly present object, turn on the second sensor; and then record data from the second sensor. The second sensor has a higher power draw than the first sensor.

The system may further include a housing containing the first sensor, the second sensor, and the computer. The system may further include a battery in the housing and electrically coupled to the first sensor, the second sensor, and the computer.

The housing may be a center high-mounted stop lamp (CHMSL) housing, the first sensor may be arranged in the CHMSL housing so that a field of view of the first sensor encompasses a storage area of the vehicle when the CHMSL housing is installed, and the second sensor may be arranged in the CHMSL housing so that a field of view of the second sensor encompasses the storage area when the CHMSL housing is installed.

The first sensor may be a radar, and the second sensor may be a camera.

The first sensor may be a capacitive sensor, and the second sensor may be one of a radar or a camera.

A method includes selecting a scanning rate for a first sensor of a vehicle based on at least one of data related to a current time or data related to a location of the vehicle; instructing the first sensor to run at the selected scanning rate; in response to receiving data from the first sensor indicating a newly present object, turning on a second sensor; and then recording data from the second sensor. The second sensor has a higher power draw than the first sensor.

With reference to the Figures, a computer 118, 130 in a vehicle 100 includes a processor and a memory storing instructions executable by the processor to select a scanning rate for a first sensor 102 of a vehicle 100 based on at least one of data related to a current time or data related to a location of the vehicle 100; instruct the first sensor 102 to run at the selected scanning rate; in response to receiving data from the first sensor 102 indicating a newly present object, turn on a second sensor 104; and then record data from the second sensor 104. The second sensor 104 has a higher power draw than the first sensor 102. The computer 118, 130 can be one computer or multiple computers wired together, e.g., a CHMSL control module 118, a vehicle computer 130, or both wired together.

A system 106 including the computer 118, 130, the first sensor 102, the second sensor 104, etc. provides an energy-efficient way to monitor an area in, on, or around the vehicle 100. The second sensor 104, which is the more energy-intensive of the sensors 102, 104, can remain powered off until an event occurs for the second sensor 104 to record, as determined by the first sensor 102, which is the less energy-intensive of the sensors 102, 104. Furthermore, the first sensor 102 can have its scanning rate adjusted to run less frequently in situations in which more frequent scanning is less important, further saving energy. The energy savings are especially important for when the vehicle 100 is powered off and the first sensor 102 and second sensor 104 are relying on a finite supply of stored energy.

With reference to FIG. 1, the vehicle 100 may be any suitable type of automobile, e.g., a passenger or commercial automobile such as a sedan, a coupe, a truck, a sport utility, a crossover, a van, a minivan, a taxi, a bus, etc.

The vehicle 100 may include a body 108. The vehicle 100 may be of a unibody construction, in which a frame and the body 108 of the vehicle 100 are a single component. The vehicle 100 may, alternatively, be of a body-on-frame construction, in which the frame supports the body 108 that is a separate component from the frame. The frame and body 108 may be formed of any suitable material, for example, steel, aluminum, etc.

The body 108 of the vehicle 100 includes a storage area 110, i.e., an area to place cargo to be transported by the vehicle 100. The storage area 110 can be exposed, such as a pickup-truck bed, as shown in FIG. 1. The storage area 110 can instead include a covering, such as a trunk with a trunk lid.

Figure 2:
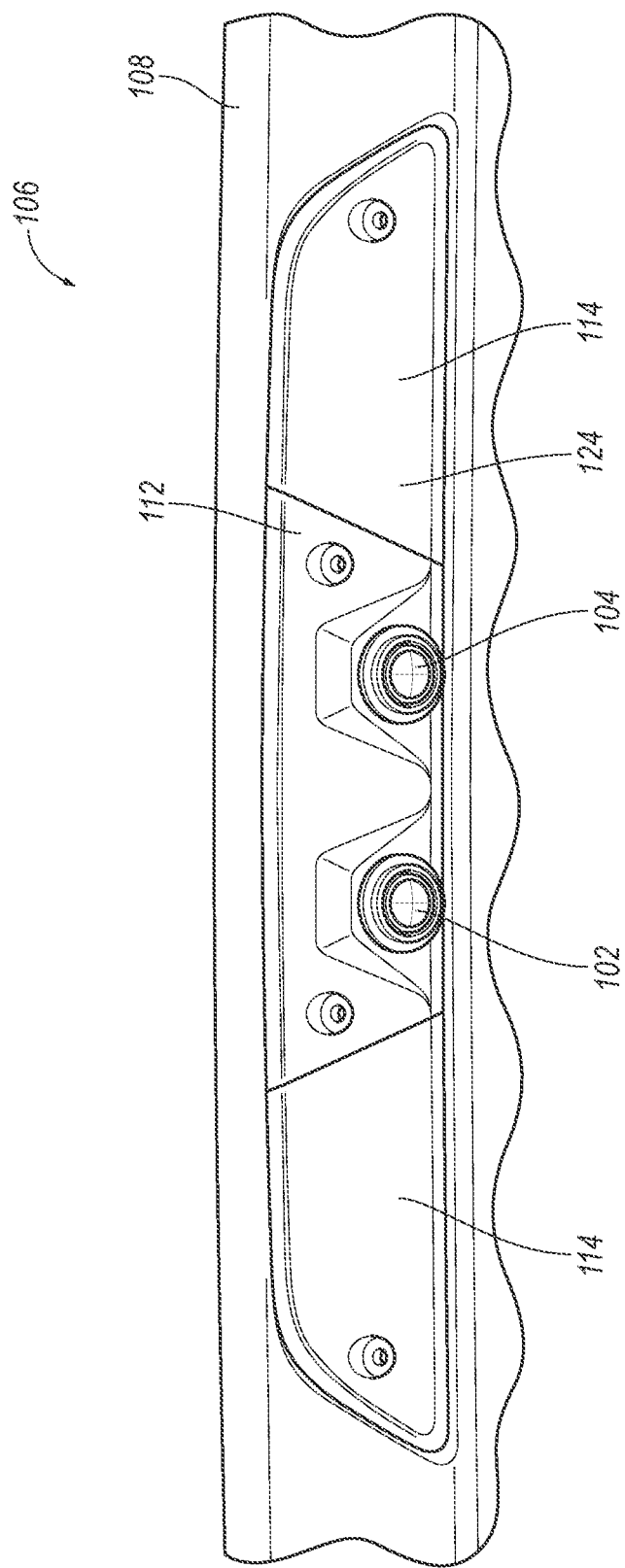
FIG. 2 is a plan view of a center high-mounted stop lamp (CHMSL) unit of the vehicle.
Figure 3:
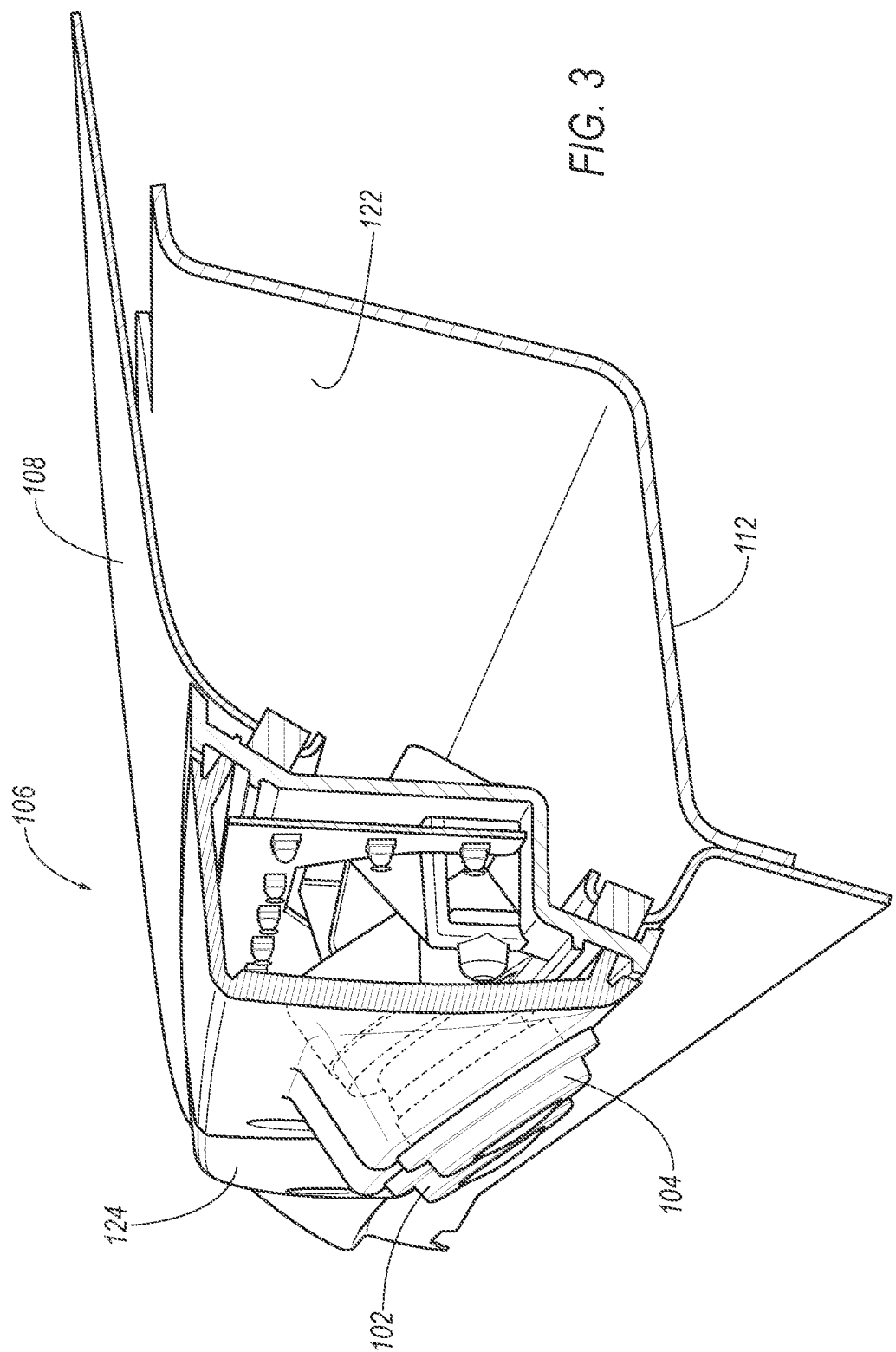
FIG. 3 is a perspective cutaway view of the CHMSL unit.
Figure 4:
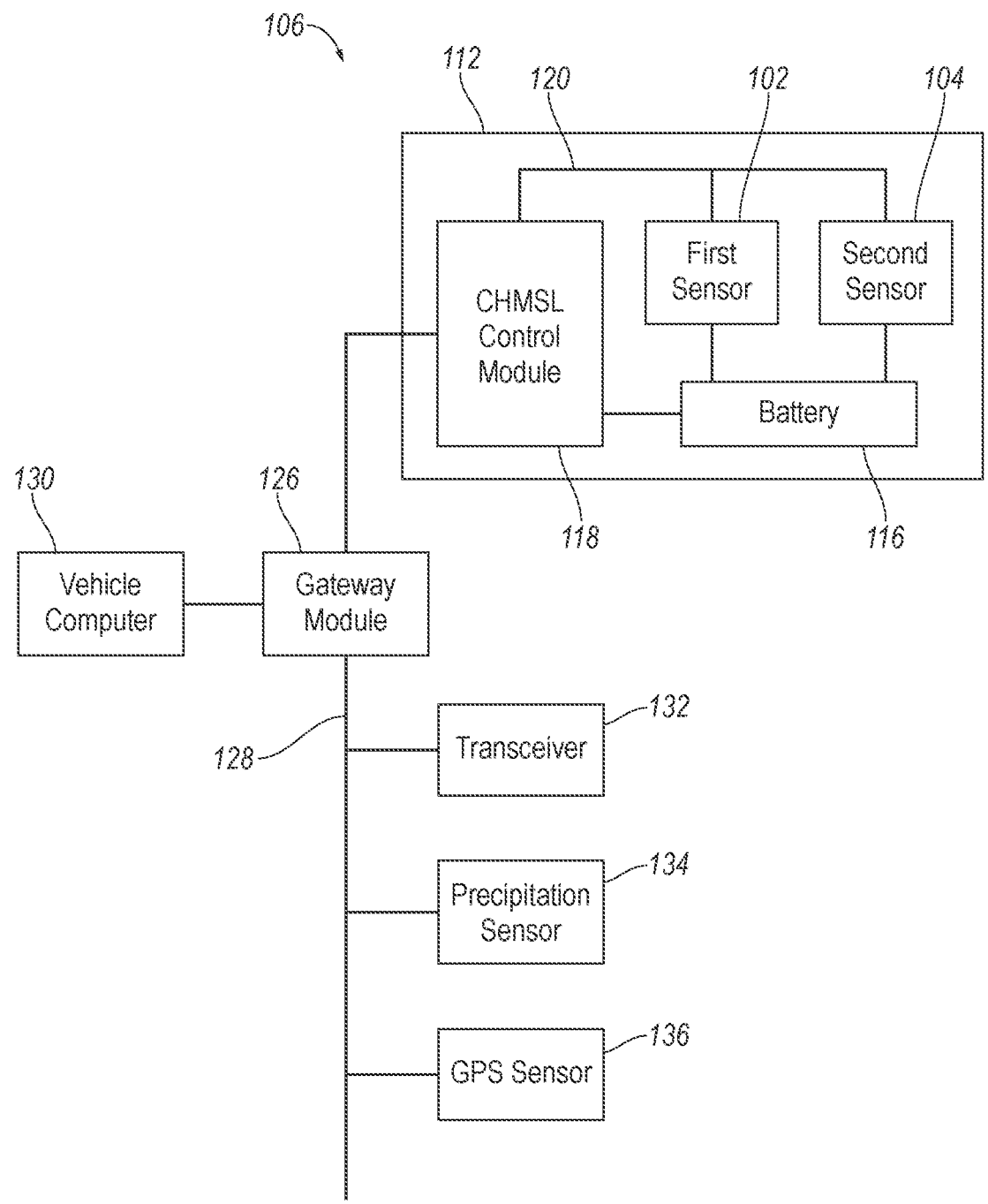
FIG. 4 is a block diagram of the CHMSL unit in the vehicle.

With reference to FIGS. 2 and 3, the vehicle 100 includes a center high-mounted stop lamp (CHMSL) housing 112. The CHMSL housing 112 contains the first sensor 102, the second sensor 104, at least one lamp 114, a battery 116, a CHMSL control module 118, and a local interconnect network (LIN) 120, as shown in FIG. 4. The CHMSL housing 112 can include an internal panel 122 and a lamp panel 124. The internal panel 122 can be concealed inside the body 108 of the vehicle 100. The lamp panel 124 can be exposed on the body 108 of the vehicle 100. Some or all of the lamp panel 124 is transparent, and some or all of the transparent portion of the lamp panel 124 is colored, e.g., red to indicate braking. The lamp panel 124 covers the lamps 114, which can be illuminated to indicate the vehicle 100 is braking and/or shifted into reverse.

The lamps 114 are positioned inside the CHMSL housing 112. The lamps 114 may be any lighting system suitable for easy visibility by other vehicles operating near the vehicle 100, e.g., tungsten, halogen, high-intensity discharge (HID) such as xenon, light-emitting diode (LED), laser, etc.

The first sensor 102 is a type suitable for detecting objects, e.g., in or near the storage area 110. In particular, the first sensor 102 can be a radar. A radar as is known uses radio waves to determine the relative location, angle, and/or velocity of an object by tracking the time required for the radio waves generated by the radar to reflect back to the radar. The first sensor 102 runs at a scanning rate, which is an occurrence interval of generating and transmitting the radio waves, e.g., twice per second, four times per second, etc. The power draw, i.e., the rate of power consumption, of the first sensor 102 depends on the scanning rate, i.e., typically is higher for higher scanning rates.

The first sensor 102 can be arranged in the CHMSL housing 112 so that a field of view of the first sensor 102 encompasses the storage area 110 of the vehicle 100 when the CHMSL housing 112 is installed. For example, the first sensor 102 can be bolted into a fixed position relative to the CHMSL housing 112. The first sensor 102 can face rearward and downward.

The second sensor 104 is a type suitable for providing detailed data about a surrounding area, e.g., the storage area 110 and objects in or near the storage area 110. In particular, the second sensor 104 can be a camera. A camera as is known detects electromagnetic radiation in some range of wavelengths. For example, the camera may detect visible light, infrared radiation, ultraviolet light, or some range of wavelengths including visible, infrared, and/or ultraviolet light. The power draw of the second sensor 104 is higher than the power draw of the first sensor 102, for any scanning rate of the first sensor 102.

The second sensor 104 can be arranged in the CHMSL housing 112 so that a field of view of the second sensor 104 encompasses the storage area 110 when the CHMSL housing 112 is installed. For example, the second sensor 104 can be bolted into a fixed position relative to the CHMSL housing 112. The second sensor 104 can face rearward and downward.

Alternatively or additionally, the first sensor 102 can be a capacitive sensor, and the second sensor 104 can be a radar sensor or a camera. A capacitive sensor detects voltage across a capacitor, which is affected by nearby objects with a different dielectric constant than air. A capacitive sensor can have a range of, e.g., four to ten feet. The capacitive sensor can be arranged to have a detection area covering the storage area 110. The power draw of a capacitive sensor is less than the power draw of a radar sensor and less than the power draw of a camera.

With reference to FIG. 4, the battery 116 is disposed in the CHMSL housing 112. The battery 116 is electrically coupled to the first sensor 102, the second sensor 104, and the CHMSL control module 118. The battery 116 can be any type suitable for powering the first sensor 102, the second sensor 104, and the CHMSL control module 118 while the vehicle 100 is off, e.g., a lithium-ion battery, a nickel-metal hydride battery, a lead-acid battery, an ultracapacitor, etc.

The CHMSL control module 118 is a microprocessor-based computing device, e.g., a generic computing device including a processor and a memory, an electronic controller or the like, a field-programmable gate array (FPGA), an application-specific integrated circuit (ASIC), etc. The CHMSL control module 118 can thus include a processor, a memory, etc. The memory of the CHMSL control module 118 can include media for storing instructions executable by the processor as well as for electronically storing data and/or databases, and/or the CHMSL control module 118 can include structures such as the foregoing by which programming is provided.

The LIN 120 communicatively couples the CHMSL control module 118 to the first sensor 102, the second sensor 104, the battery 116, and a gateway module 126. The LIN 120 is a network employing a serial network protocol, specifically the local interconnect network standard. Alternatively, the CHMSL control module 118 can be directly communicatively coupled to a controller area network (CAN) bus 128 of the vehicle 100.

The vehicle 100 includes the gateway module 126. The gateway module 126 is a control module that connects and transmits data between buses of different domains in the vehicle 100, e.g., the LIN 120, the CAN bus 128, Ethernet, other LINs, OBD-II, etc.

The vehicle 100 includes the CAN bus 128. The CAN bus 128 communicatively couples the gateway module 126, a vehicle computer 130, a transceiver 132, a precipitation sensor 134, a global positioning system (GPS) sensor 136, and other components. The vehicle computer 130 is communicatively coupled to the first sensor 102 and the second sensor 104 via the CAN bus 128 and the LIN 120. The CAN bus 128 is a network using a vehicle bus CAN standard, which is a message-based protocol employing multiplexing.

The vehicle computer 130 is a microprocessor-based computing device, e.g., a generic computing device including a processor and a memory, an electronic controller or the like, a field-programmable gate array (FPGA), an application-specific integrated circuit (ASIC), etc. The vehicle computer 130 can thus include a processor, a memory, etc. The memory of the vehicle computer 130 can include media for storing instructions executable by the processor as well as for electronically storing data and/or databases, and/or the vehicle computer 130 can include structures such as the foregoing by which programming is provided. The vehicle computer 130 can be multiple computers, e.g., control modules, coupled together.

The transceiver 132 may be adapted to transmit signals wirelessly through any suitable wireless communication protocol, such as Bluetooth®, WiFi, IEEE 802.11a/b/g, Ultra-Wideband (UWB) or other RF (radio frequency) communications, etc. The transceiver 132 may be adapted to communicate with a remote computing device, that is, a computing device distinct and physically spaced from the vehicle 100. The remote computing device may be located outside the vehicle 100. For example, the remote computing device may be associated with another vehicle (e.g., V2V communications), an infrastructure component (e.g., V2I communications via Dedicated Short-Range Communications (DSRC) or the like), an emergency responder, a mobile device associated with the owner of the vehicle 100, etc. The transceiver 132 may be one device or may include a separate transmitter and receiver.

The GPS sensor 136 receives data from GPS satellites. The Global Positioning System (GPS) is a global navigation satellite system. The satellites broadcast time and geolocation data. The GPS sensor 136 can determine a location of the vehicle 100, i.e., latitude and longitude, based on receiving the time and geolocation data from multiple satellites simultaneously.

The precipitation sensor 134 can be any sensor suitable to detect precipitation. For example, the precipitation sensor 134 may be a piezoelectric sensor coupled to the windshield to detect vibrations from, e.g., precipitation. Vibration data such as amplitude and frequency may be associated with, e.g., types of precipitation such as rain or hail. Alternatively, the precipitation sensor 134 may be positioned where water from rain will pool and configured to detect such water. For example, the precipitation sensor 134 may include two electrical leads that, when connected, close a circuit; when water is present between the leads, the conductivity of water changes to allow current to flow through the circuit where previously it would not have done so, or changes how much current is flowing by a known amount. For another example, the precipitation sensor 134 may include an LED bulb, a light sensor, and possibly a prism reflecting light from the LED bulb to the light sensor; the presence of water scatters some of the light, reducing the light received by the light sensor by a known amount.

Figure 5:
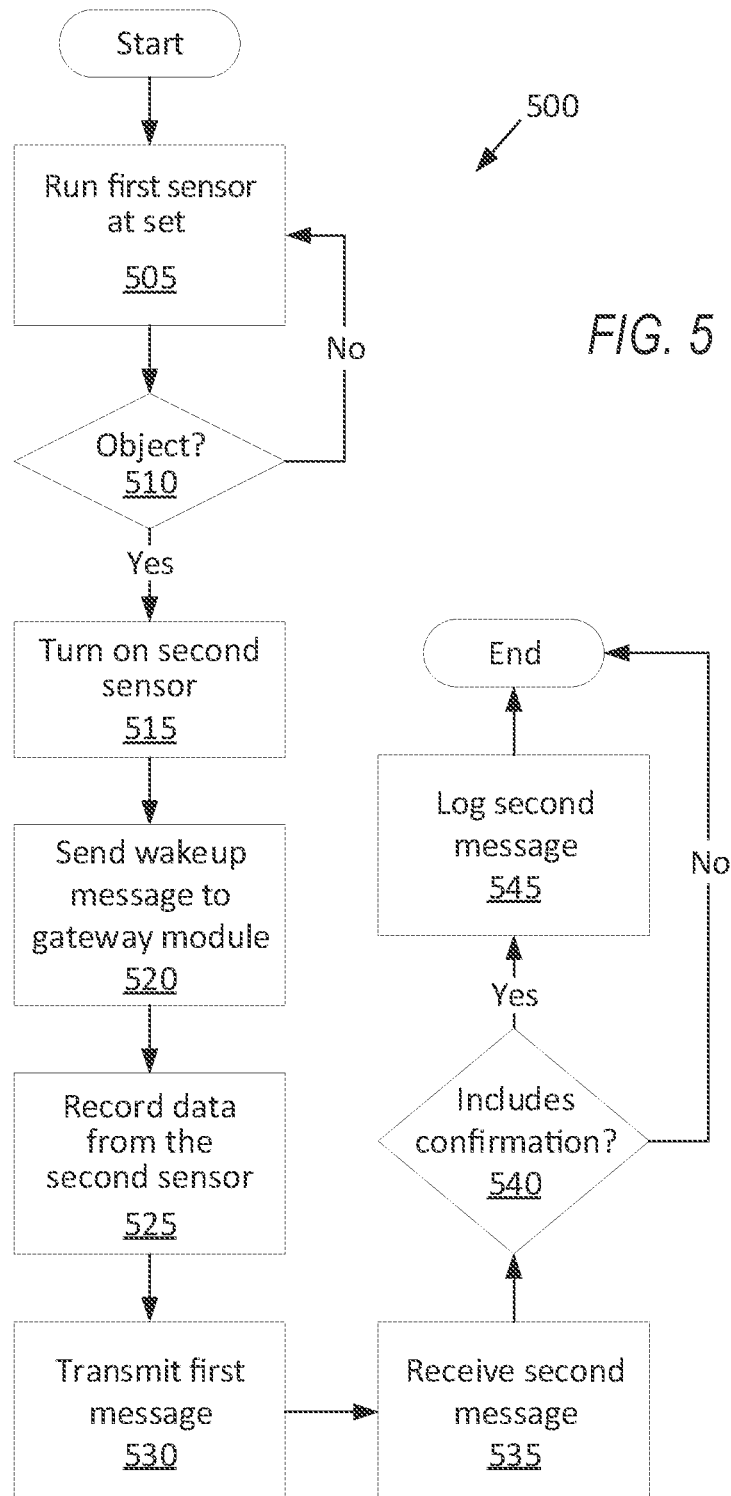
FIG. 5 is a process flow diagram of an example process for detecting an object in a storage area of the vehicle.

FIG. 5 is a process flow diagram illustrating an exemplary process 500 for detecting an object in the storage area 110. The memories of the CHMSL control module 118 and/or the vehicle computer 130 store executable instructions for performing the steps of the process 500 and/or programming can be implemented in structures such as mentioned above. The process 500 is run when the vehicle 100 is off. By default, when the vehicle 100 is off, i.e., when the process 500 begins, the vehicle computer 130 does not receive power and is off, the CHMSL control module 118 and the first sensor 102 draw power from the battery 116, and the second sensor 104 is off.

As a general overview of the process 500, the first sensor 102 is run at the scanning rate (which is set as described below in a process 600) if the first sensor 102 is a radar sensor. Upon determining that the first sensor 102 detected an object, the CHMSL control module 118 turns on the second sensor 104 and sends a wakeup message the gateway module 126. Then the vehicle computer 130 records the data generated by the second sensor 104, transmits a first message to a remote computing device, and receives a second message from the remote computing device. The first message can include data from the second sensor 104. If the second message includes a confirmation (which can be selected by an operator at the remote computing device based on a judgment of the importance of the data from the second sensor 104), the vehicle computer 130 logs the second message.

The process 500 begins in a block 505, in which the CHMSL control module 118 instructs the first sensor 102 to run at a currently selected scanning rate if the first sensor 102 is a radar sensor. The process 600 described below determines the scanning rate and runs simultaneously with the process 500. The CHMSL control module 118 receives data from the first sensor 102 as the data is produced at the scanning rate. If the first sensor 102 is a capacitive sensor, the CHMSL control module 118 receives data from the first sensor 102 continuously.

Next, in a decision block 510, the CHMSL control module 118 determines whether the data received from the first sensor 102 indicates a newly present object, e.g., in the storage area 110 or a region including the storage area 110 and an area behind the vehicle 100. For example, the CHMSL control module 118 can determine from the data received from the first sensor 102 that radio waves in some direction indicate a shorter distance than before. If the data does not indicate a newly present object, the process 500 returns to the block 505 to continue monitoring the data from the first sensor 102 for newly present objects. If the data indicates a newly present object, the process 500 proceeds to a block 515.

In the block 515, the CHMSL control module 118 turns on the second sensor 104, e.g., via an instruction transmitted through the LIN 120.

Next, in a block 520, the CHMSL control module 118 transmits a message instructing at least one vehicle system to wake up. For example, the CHMSL control module 118 transmits a message to the gateway module 126 to wake up the vehicle computer 130 and the transceiver 132, which the gateway module 126 transmits to the vehicle computer 130 and the transceiver 132.

Next, in a block 525, the vehicle computer 130 then records data from the second sensor 104.

Next, in a block 530, the vehicle computer 130 instructs the transceiver 132 to transmit a first message to the remote computing device. The first message includes the recorded data from the second sensor 104. The remote computing device can be, e.g., a mobile device belonging to an owner or operator of the vehicle 100. The owner or operator thus has an opportunity to review the data from the second sensor 104, e.g., video or image data of the storage area 110 immediately after the first sensor 102 detected the newly present object, to assess whether something important is occurring in the storage area 110, e.g., the newly present object is a person attempting to remove objects from the storage area 110. If the owner or operator decides that the newly present object is of no concern or was a false positive, they can choose to ignore or discard the first message. If the newly present object is of concern to the owner or operator, they can choose to initiate a responsive process on the remote computing device. In either event, the remote computing device transmits a second message back to the vehicle computer 130 via the transceiver 132. If the owner or operator deemed the newly present object important, then the second message includes a confirmation of a presence of the newly present object.

Next, in a block 535, the vehicle computer 130 receives the second message from the remote computing device in response to the first message.

Next, in a decision block 540, the vehicle computer 130 determines whether the second message includes the confirmation of the presence of the newly present object. If no confirmation is included with the second message, the process 500 ends. If the second message includes the confirmation, the process 500 proceeds to a block 545.

In the block 545, the vehicle computer 130 records the second message in a log, i.e., stores the second message or part of the second message in memory. A current location of the vehicle 100 as determined from the GPS sensor 136 is stored paired with the second message. After the block 545, the process 500 ends.

Figure 6:
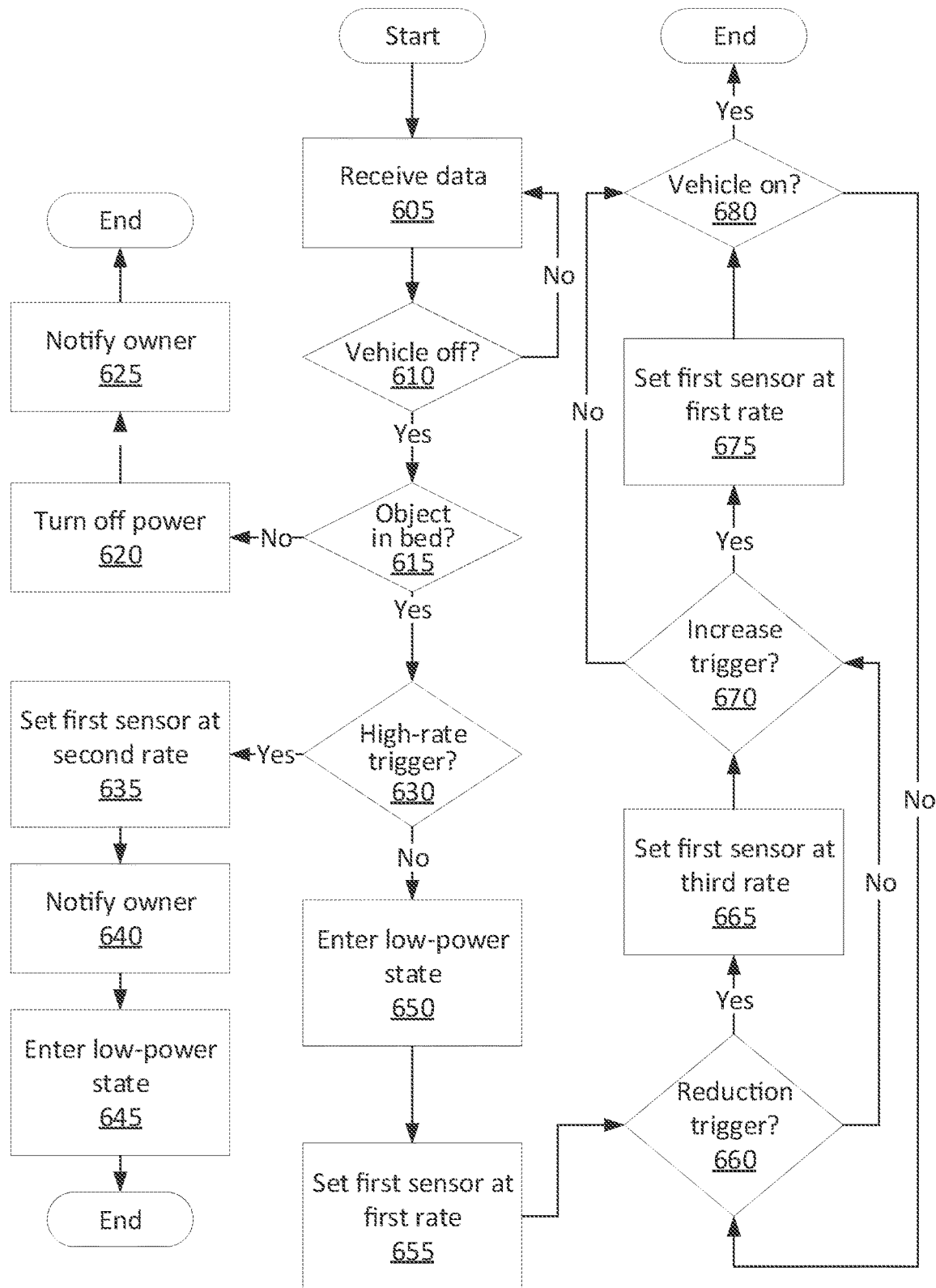
FIG. 6 is a process flow diagram of an example process for setting a scanning rate of a first sensor of the CHMSL unit.

FIG. 6 is a process flow diagram illustrating an exemplary process 600 for setting the scanning rate of the first sensor 102. The memories of the CHMSL control module 118 and/or the vehicle computer 130 store executable instructions for performing the steps of the process 600 and/or programming can be implemented in structures such as mentioned above. The process 600 begins while the vehicle 100 is on, i.e., running.

As a general overview of the process 600, when the vehicle 100 turns off, the vehicle computer 130 determines whether there are any objects in the storage area 110 and, if not, turns off the first sensor 102. If there is an object in the storage area 110, then the vehicle computer 130 determines whether a high-rate trigger event has occurred, e.g., precipitation or the vehicle 100 being in a location where a second message was logged. For the purposes of this disclosure, a "trigger event" is defined as a specific condition that can be true or false at a given time. If a high-rate trigger event has occurred, the vehicle computer 130 sets the scanning rate of the first sensor 102 at a second scanning rate that is higher than a first scanning rate and then instructs the CHMSL control module 118 to enter a low-power state. The first scanning rate is the default rate of the first sensor 102. If no high-rate trigger event has occurred, the CHMSL control module 118 enters the low-power state and sets the scanning rate of the first sensor 102 at the first scanning rate. In the low-power state, the CHMSL control module 118 sets the scanning rate at a third scanning rate that is lower than the first scanning rate in response to a reduction trigger event, and sets the scanning rate back to the first scanning rate in response to an increase trigger event. The third scanning rate is chosen to conserve energy compared to the first scanning rate when the need for scanning is lower. Examples of reduction trigger events include failing to detect any newly present object for at least a threshold duration, a lack of any second messages recorded in the log from a current location of the vehicle 100, a state of charge of the battery 116 decreasing below a charge threshold, a time of day that is during daytime, and a distance to the previously present object being greater than a first distance threshold. Examples of increase trigger events include a time of day during nighttime and the distance to the previously present object being shorter than a second distance threshold. The process 600 ends when the vehicle 100 turns on.

The process 600 begins in a block 605, in which the vehicle computer 130 receives data from the GPS sensor 136, data from the precipitation sensor 134, data from the first sensor 102, and possibly data from the second sensor 104.

Next, in a decision block 610, the vehicle computer 130 determines whether the vehicle 100 has been turned off. The vehicle computer 130 can check a setting in memory that tracks the state of the vehicle 100. If the vehicle 100 is still on, the process 600 returns to the block 605 to continue monitoring data. If the vehicle 100 has just been turned off, the process 600 proceeds to a decision block 615.

In the decision block 615, the vehicle computer 130 determines whether the data from the first sensor 102 indicates a lack of previously present objects in a region, e.g., in the storage area 110, or in the storage area 110 and an area behind the vehicle 100 where a trailer could be present. The vehicle computer 130 may additionally use data from the second sensor 104 to determine whether objects are present in the region. For example, the vehicle computer 130 can compare the data from first sensor 102 and/or the second sensor 104 with baseline data stored in memory of the region when empty. If greater than a threshold amount of the data from the first sensor 102 and/or second sensor 104 deviates from the baseline data, then the vehicle computer 130 infers that an object is present in the region. If there are no objects in the region, the process 600 proceeds to a block 620. If an object is in the region, the process 600 proceeds to a decision block 630.

In the block 620, the vehicle computer 130 prevents the first sensor 102 from running, e.g., instructs the CHMSL control module 118 to turn off components on the LIN 120, i.e., the CHMSL control module 118, the first sensor 102, and the second sensor 104.

Next, in a block 625, the vehicle computer 130 transmits a message via the transceiver 132 to the remote computing device, e.g., to the mobile device of the owner or operator of the vehicle 100. The message can notify the owner or operator that the first sensor 102 is not running because the storage area 110 does not contain any objects. After the block 625, the process 600 ends.

In the decision block 630, the vehicle computer 130 determines whether a high-rate trigger event has occurred. A high-rate trigger event is an event chosen to indicate that the first sensor 102 should operate at the second scanning rate, i.e., the higher-than-default scanning rate. A first high-rate trigger event is whether the data from the precipitation sensor 134 indicates precipitation. A second high-rate trigger event is the data from the GPS sensor 136 indicating that the vehicle 100 is at a location where a second message was logged, i.e., where an owner or operator indicated the presence of a newly present object as described above with respect to the block 545 of the process 500. If a high-rate trigger event has occurred, the process 600 proceeds to a block 635. If no high-rate trigger event has occurred, the process 600 proceeds to a block 650.

In the block 635, the vehicle computer 130 instructs the CHMSL control module 118 to increase the scanning rate of the first sensor 102 to the second scanning rate. For example, the second scanning rate can be to 8 Hz, i.e., eight times per second.

Next, in a block 640, the vehicle computer 130 transmits a message via the transceiver 132 to the remote computing device, e.g., to the mobile device of the owner or operator of the vehicle 100. The message can notify the owner or operator that the first sensor 102 is running at the second scanning rate, i.e., at a higher-than-default scanning rate, and that the energy stored in the battery 116 may be consumed more quickly.

In the block 645, the vehicle computer 130 instructs the CHMSL control module 118 to put the LIN 120 in a low-power state. Specifically, the CHMSL control module 118 turns off the second sensor 104, and the CHMSL control module 118 can enter a mode in which the CHMSL control module 118 does not send messages to the gateway module 126 (except as described above with respect to the block 520 of the process 500). The vehicle computer 130 then turns off. After the block 645, the process 600 ends.

In the block 650, the vehicle computer 130 instructs the CHMSL control module 118 to put the LIN 120 in a low-power state. Specifically, the CHMSL control module 118 turns off the second sensor 104, and the CHMSL control module 118 can enter a mode in which the CHMSL control module 118 does not send messages to the gateway module 126 (except as described above with respect to the block 520 of the process 500). The vehicle computer 130 transmits the data received in the block 605 above to the CHMSL control module 118. The vehicle computer 130 also transmits the second messages recorded in the log, or the vehicle computer 130 transmits only the second messages recorded in the log at a current location of the vehicle 100, as defined by the data from the GPS sensor 136. The vehicle computer 130 transmits sunrise and sunset times for a next number of days, e.g., a number of days at which the battery 116 will expend energy equal to its capacity, e.g., five days. The vehicle computer 130 then turns off.

Next, in a block 655, the CHMSL control module 118 instructs the first sensor 102 to run at the first scanning rate, i.e., the default scanning rate. For example, the first scanning rate can be, e.g., 4 Hz, i.e., four times per second.

Next, in a decision block 660, the CHMSL control module 118 determines whether a reduction trigger event has occurred. A reduction trigger event is an event chosen to indicate that the first sensor 102 should operate at the third scanning rate, i.e., the lower-than-default scanning rate. If any of the reduction trigger events described immediately below are satisfied, the process 600 proceeds to a block 665. If none of the reduction trigger events are satisfied, the process 600 proceeds to a decision block 670.

A first reduction trigger event is failing to detect any newly present object for at least a threshold duration. In other words, the process 500 above runs for at least the threshold duration without moving beyond the decision block 510, i.e., just cycling between the block 505 and the decision block 510. The threshold duration can be chosen to, e.g., last for a busier time shortly after sundown in the evening and end during a less busy time at night, e.g., two hours.

A second reduction trigger event is a lack of any second messages recorded in the log from a current location of the vehicle 100. The CHMSL control module 118 may have received any second messages recorded in the log at the current location of the vehicle 100 in the block 650 above, and any second messages received by the CHMSL control module 118 indicate that the second reduction trigger event is satisfied. Alternatively, the CHMSL control module 118 may have received the second messages from the log and the GPS data, the CHMSL control module 118 determines whether any of the second messages are from the current location of the vehicle 100.

A third reduction trigger event is a state of charge of the battery 116 decreasing below a charge threshold. The CHMSL control module 118 can continuously receive the state of charge of the battery 116 via the LIN 120. The charge threshold can be chosen to indicate that the battery 116 is likely to run out of energy before the vehicle 100 is next turned on, e.g., within 24 hours.

A fourth reduction trigger event is a time of day that is during daytime. The CHMSL control module 118 can include a clock and can compare the current time to the sunrise and sunset times received from the vehicle computer 130 in the block 650. If the current time is after a sunrise time and before the next sunset time, then the fourth reduction trigger event is satisfied.

A fifth reduction trigger event is a distance to the previously present object being greater than a first distance threshold. The first distance threshold can be chosen to indicate that the previously present object is on a trailer or otherwise spaced from the vehicle 100, e.g., ten meters.

In the block 665, the CHMSL control module 118 reduces the scanning rate of the first sensor 102, e.g., instructs the first sensor 102 to run at the third scanning rate. For example, the third scanning rate can be, e.g., 2 Hz, i.e., two times per second.

Next, in the decision block 670, the CHMSL control module 118 determines whether an increase trigger event has occurred. An increase trigger event is an event chosen to indicate that the first sensor 102 should operate at the first scanning rate, i.e., the default scanning rate rather than the lower-than-default scanning rate. If any of the increase trigger events described immediately below are satisfied, the process 600 proceeds to a block 675. If none of the reduction trigger events are satisfied, the process 600 proceeds to a decision block 680.

A first increase trigger event is a time of day during nighttime. The CHMSL control module 118 can compare the current time to the sunrise and sunset times received from the vehicle computer 130 in the block 650. If the current time is after a sunset time and before the next sunrise time, then the first increase trigger event is satisfied.

A second increase trigger event is the distance to the previously present object being shorter than a second distance threshold. The second distance threshold can be chosen to indicate that the previously present object is, e.g., in the storage area 110, e.g., two meters.

In the block 675, the CHMSL control module 118 increases the scanning rate of the first sensor 102, e.g., instructs the first sensor 102 to run at the first scanning rate.

Next, in the decision block 680, the CHMSL control module 118 determines whether the vehicle 100 has turned on. The CHMSL control module 118 can determine that the vehicle 100 is on based on whether the CHMSL control module 118 has received a message from the gateway module 126 indicating that the vehicle 100 is on. If the vehicle 100 is still off, the process 600 returns to the decision block 660 to continue determining whether to adjust the scanning rate of the first sensor 102. If the vehicle 100 has turned on, the process 600 ends.

Figure 7:
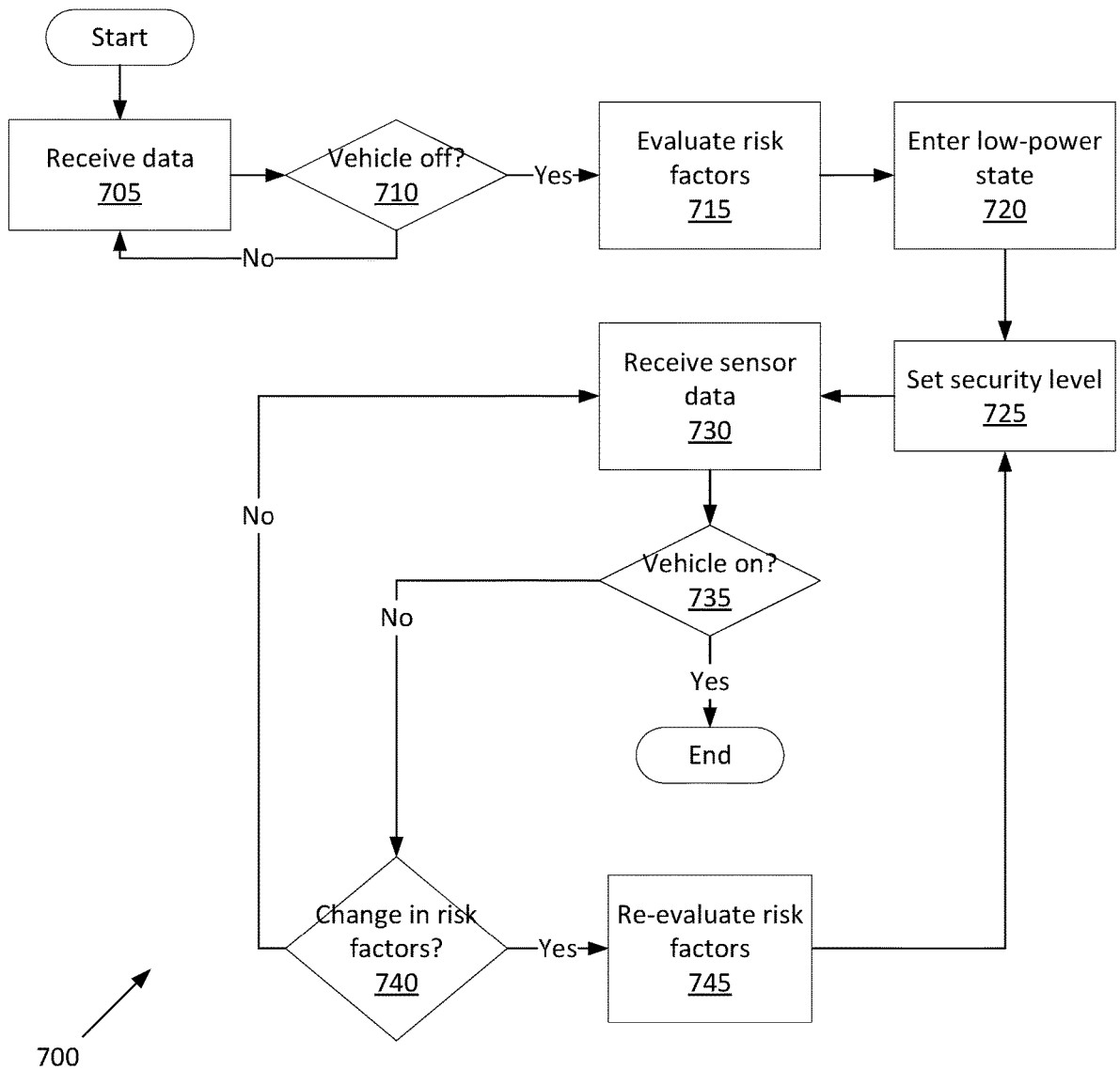
FIG. 7 is a process flow diagram of another example process for setting the scanning rate of the first sensor.

FIG. 7 is a process flow diagram illustrating an exemplary process 700 for selecting the first sensor 102 and setting the scanning rate of the first sensor 102. The memories of the CHMSL control module 118 and/or the vehicle computer 130 store executable instructions for performing the steps of the process 700 and/or programming can be implemented in structures such as mentioned above. The process 700 begins while the vehicle 100 is on, i.e., running.

As a general overview of the process 700, when the vehicle 100 turns off, the vehicle computer 130 or the CHMSL control module 118 evaluates a plurality of risk factors related to at least one of data related to a current time or data related to a location of the vehicle 100 to determine a risk score, and the vehicle computer 130 instructs the CHMSL control module 118 to enter a low-power state. The CHMSL control module 118 sets a sensor (e.g., capacitive sensor or radar sensor) as the first sensor 102 and/or selects a scanning rate for the first sensor 102. While the vehicle 100 remains off, the CHMSL control module 118 receives data from the first sensor 102, and if the risk factors change, re-evaluates the risk factors and sets a different sensor as the first sensor 102 and/or selects a different scanning rate for the first sensor 102.

The process 700 begins in a block 705, in which the vehicle computer 130 receives data related to a current time and data related to a location of the vehicle 100. The data related to the current time includes the current time of day and the day of the week. The current time can be tracked by a clock functionality internal to the vehicle computer 130 as well as by a clock functionality internal to the CHMSL control module 118. The day of the week can be stored in memory of the vehicle computer 130. The data related to the location of the vehicle 100 includes the current location of the vehicle from the GPS sensor 136, statistical data about the current location received via the transceiver 132, and information about public events near the current location received via the transceiver 132.

Next, in a decision block 710, the vehicle computer 130 determines whether the vehicle 100 has been turned off. The vehicle computer 130 can check a setting in memory that tracks the state of the vehicle 100. If the vehicle 100 is still on, the process 700 returns to the block 705 to continue monitoring data. If the vehicle 100 has just been turned off, the process 700 proceeds to a block 715.

In the block 715, the vehicle computer 130 or the CHMSL control module 118 evaluates risk factors based on the data received in the block 705 and calculates a risk score. The individual risk factors are discussed in turn in the paragraphs below. The risk score can be calculated by, e.g., summing values for each of the risk factors, e.g., $\Sigma x_i$, in which x is the value of the respective risk factor and i is an index indicating the risk factor. The risk factors are exemplary, and the risk score can be calculated using all, some, or one of the risk factors, and the risk score may also use other risk factors. The values x for the risk factors can each be scaled to a range, e.g., of 0 to 1. Alternatively or additionally, the values for the risk factors can be weighted in the summation, e.g., $\Sigma w_i x_i$, in which w is the weight of the respective risk factor. The weights w can be chosen based on a relative effect on a likelihood of an incident involving the storage area 110, e.g., according to known statistical data.

A first risk factor is a duration without the first sensor 102 receiving data indicating a newly present object. For example, the duration can be the current time minus either the time at which the first sensor 102 received data indicating a newly present object, as described above with respect to the decision block 510 above, or the time at which vehicle 100 turned off in the decision block 710 above. A greater duration indicates a lower risk.

A second risk factor is a duration since the vehicle 100 turned off. For example, the duration can be the current time minus the time at which the vehicle 100 turned off in the decision block 710 above. A greater duration indicates a lower risk.

A third risk factor is the current time of day. For example, the vehicle computer 130 and/or the CHMSL control module 118 can store a value for the third risk factor for each hour and use the value for the hour of the current time of day. The values can be chosen based on known statistics by time of day, e.g., of a rate of theft.

A fourth risk factor is a current day of the week. For example, the vehicle computer 130 and/or the CHMSL control module 118 can store a value for the fourth risk factor for each day of the week and use the value for the current day. The values can be chosen based on known statistics by day of the week, e.g., of a rate of theft.

A fifth risk factor is statistical data about the location of the vehicle. For example, the statistical data can be population data or theft rate data.

A sixth risk factor is data indicating a public event within a distance threshold of the location of the vehicle. For the purposes of this disclosure, a "public event" is defined as an event drawing a number of people to its location, such as a concert, a sporting event, an art fair, etc. The distance threshold can be chosen based on how far the attendees of such an event are likely to disperse from the location of the event. The value for the sixth risk factor can be binary, indicating the existence or nonexistence of any events. Alternatively, the value for the sixth risk factor can be a distance of the event from the location. Still alternatively, the value for the sixth risk factor can be one of a set of prestored values corresponding to a type of the event, e.g., a first prestored value for concerts, a second prestored value for sporting events, a third prestored value for art fairs, etc.

Next, in a block 720, the vehicle computer 130 instructs the CHMSL control module 118 to put the LIN 120 in a low-power state. Specifically, the CHMSL control module 118 turns off the second sensor 104, and the CHMSL control module 118 can enter a mode in which the CHMSL control module 118 does not send messages to the gateway module 126 (except as described above with respect to the block 520 of the process 500). The vehicle computer 130 transmits the data received in the block 705 above to the CHMSL control module 118.

Next, in a block 725, the CHMSL control module 118 selects a security level. The security level specifies which sensor is the first sensor 102 and/or the scanning rate of the first sensor 102, if applicable. For example, the CHMSL control module 118 can select from four prestored security levels: a first security level for which the capacitive sensor is the first sensor 102, a second security level for which the radar sensor is the first sensor 102 and runs at a scanning rate of once every four seconds, a third security level for which the radar sensor is the first sensor 102 and runs at a scanning rate of once every two seconds, and a fourth security level for which the radar sensor is the first sensor 102 and runs at a scanning rate of twice per second. The CHMSL control module 118 selects the security level based on the risk score determined in the block 715 or changed in a block 745. For example, the range of possible risk scores can be divided into four ranges that correspond to the four security levels.

Next, in a block 730, the CHMSL control module 118 receives sensor data from the first sensor 102, e.g., at the next scan by the first sensor 102.

Next, in a decision block 735, the CHMSL control module 118 determines whether the vehicle 100 has turned on. The CHMSL control module 118 can determine that the vehicle 100 is on based on whether the CHMSL control module 118 has received a message from the gateway module 126 indicating that the vehicle 100 is on. If the vehicle 100 is still off, the process 700 proceeds to a decision block 740. If the vehicle 100 has turned on, the process 700 ends.

In the decision block 740, the CHMSL control module 118 determines whether any of the risk factors have changed, meaning that the selected first sensor 102 and/or the selected scanning rate from the block 725 may be adjusted. For example, the first, second, and third risk factors change as the internal clock changes. Changes to the first, second, and third risk factors can be limited to, e.g., when the hour of the current time changes, in order to prevent too frequent changes to the security level. For another example, the first risk factor changes if the CHMSL control module 118 received data indicating a newly present object in the block 730. If none of the risk factors change, the process 700 returns to the block 730 to receive data from the first sensor 102, e.g., from the next scan, as the internal clock of the CHMSL control module 118 counts. If one of the risk factors changes, the process 700 proceeds to the block 745.

In the block 745, the CHMSL control module 118 evaluates the risk factors and recalculates the risk score, as described above with respect to the block 715. The CHMSL control module 118 can calculate the updated risk score by determining the change in the risk score from the change in the risk factor that changed in the decision block 740 and applying that change to the previous risk score. After the block 745, the process 700 returns to the block 725 to set the security level according to the updated risk score.

Computer executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a networked device is generally a collection of data stored on a computer readable medium, such as a storage medium, a random access memory, etc. A computer readable medium includes any medium that participates in providing data (e.g., instructions), which may be read by a computer. Such a medium may take many forms, including, but not limited to, non volatile media, volatile media, etc. Non volatile media include, for example, optical or magnetic disks and other persistent memory. Volatile media include dynamic random access memory (DRAM), which typically constitutes a main memory. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A computer comprising a processor and a memory storing instructions executable by the processor to:
   select a scanning rate for a first sensor of a vehicle based on at least one of data related to a current time or data related to a location of the vehicle, wherein selecting the scanning rate for the first sensor includes selecting the scanning rate based on a duration since the vehicle turned off;
   instruct the first sensor to run at the selected scanning rate;
   in response to receiving data from the first sensor indicating a newly present object, turn on a second sensor, wherein the second sensor has a higher power draw than the first sensor; and
   then record data from the second sensor.

2. The computer of claim 1, wherein selecting the scanning rate for the first sensor includes selecting the scanning rate based on the current time.

3. The computer of claim 2, wherein selecting the scanning rate for the first sensor includes selecting the scanning rate based on a duration without the first sensor receiving data indicating a newly present object.

4. The computer of claim 2, wherein selecting the scanning rate for the first sensor includes selecting the scanning rate based on a current time of day.

5. The computer of claim 2, wherein selecting the scanning rate for the first sensor includes selecting the scanning rate based on a current day of the week.

6. The computer of claim 2, wherein the instructions further include instructions to adjust the selected scanning rate based on a change of the current time.

7. The computer of claim 1, wherein selecting the scanning rate for the first sensor includes selecting the scanning rate based on the data related to the location of the vehicle.

8. The computer of claim 7, wherein selecting the scanning rate for the first sensor includes selecting the scanning rate based on statistical data about the location of the vehicle.

9. The computer of claim 8, wherein the statistical data is population data.

10. The computer of claim 7, wherein selecting the scanning rate for the first sensor includes selecting the scanning rate based on data indicating a public event within a distance threshold of the location of the vehicle.

11. The computer of claim 10, wherein selecting the scanning rate for the first sensor includes selecting the scanning rate based on data indicating a type of the public event.

12. The computer of claim 1, wherein selecting the scanning rate for the first sensor includes selecting the scanning rate based on a risk score calculated using the at least one of the data related to the current time or the data related to the location of the vehicle.

13. A system for a vehicle comprising:
   a first sensor;
   a second sensor having a higher power draw than the first sensor; and
   a computer communicatively coupled to the first sensor and the second sensor;
   wherein the computer is programmed to:
   select a scanning rate for the first sensor based on at least one of data related to a current time or data related to a location of the vehicle, wherein selecting the scanning rate for the first sensor includes selecting the scanning rate based on a duration since the vehicle turned off;
   instruct the first sensor to run at the selected scanning rate;
   in response to receiving data from the first sensor indicating a newly present object, turn on the second sensor, wherein the second sensor has a higher power draw than the first sensor; and
   then record data from the second sensor.

14. The system of claim 13, further comprising a housing containing the first sensor, the second sensor, and the computer.

15. The system of claim 14, further comprising a battery in the housing and electrically coupled to the first sensor, the second sensor, and the computer.

16. The system of claim 14, wherein the housing is a center high-mounted stop lamp (CHMSL) housing, the first sensor is arranged in the CHMSL housing so that a field of view of the first sensor encompasses a storage area of the vehicle when the CHMSL housing is installed, and the second sensor is arranged in the CHMSL housing so that a field of view of the second sensor encompasses the storage area when the CHMSL housing is installed.

17. The system of claim 13, wherein the first sensor is a radar, and the second sensor is a camera.

18. The system of claim 13, wherein the first sensor is a capacitive sensor, and the second sensor is one of a radar or a camera.

19. A method comprising:
selecting a scanning rate for a first sensor of a vehicle based on at least one of data related to a current time or data related to a location of the vehicle, wherein selecting the scanning rate for the first sensor includes selecting the scanning rate based on a duration since the vehicle turned off;
instructing the first sensor to run at the selected scanning rate;
in response to receiving data from the first sensor indicating a newly present object, turning on a second sensor, wherein the second sensor has a higher power draw than the first sensor; and
then recording data from the second sensor.

20. The computer of claim 1, wherein
the instructions further include instructions to calculate a risk score based on the duration since the vehicle turned off, the duration being greater indicating higher risk; and
selecting the scanning rate for the first sensor includes selecting the scanning rate based on the risk score.

* * * * *